United States Patent

Iga et al.

[11] Patent Number: 5,819,899
[45] Date of Patent: Oct. 13, 1998

[54] ONE-WAY CLUTCH, ROLLER BEARING WITH ONE-WAY CLUTCH, AND METHOD OF ASSEMBLING ROLLER BEARING WITH ONE-WAY CLUTCH

[75] Inventors: Kazuo Iga, Yamatotakada; Kazuaki Yamada; Satoshi Fujiwara, both of Kashiwara, all of Japan

[73] Assignee: Koyo Seiko Co., Ltd., Osaka, Japan

[21] Appl. No.: 720,873

[22] Filed: Oct. 3, 1996

[30] Foreign Application Priority Data

Oct. 3, 1995 [JP] Japan .................................. 7-256254
Oct. 9, 1995 [JP] Japan .................................. 7-261852

[51] Int. Cl.$^6$ ...................................................... F16D 41/07
[52] U.S. Cl. ................ 192/45.1; 192/110 B; 29/898.061
[58] Field of Search .................................. 192/45.1, 41 A, 192/110 B, 45; 29/898.061, 898.063; 384/537, 584

[56] References Cited

U.S. PATENT DOCUMENTS

| 3,006,447 | 10/1961 | Irwin | 192/45.1 |
| 3,324,980 | 6/1967 | Rojic et al. | 192/45.1 |
| 3,651,908 | 3/1972 | Oldfield | 192/45.1 |
| 3,937,310 | 2/1976 | Oldfield | 192/45.1 X |
| 3,938,632 | 2/1976 | Giese et al. | 192/45.1 X |
| 4,878,569 | 11/1989 | Schaeffler | 192/45 |
| 4,989,705 | 2/1991 | Kashio et al. | 192/45 |
| 5,664,653 | 9/1997 | Kurita et al. | 192/45.1 |

FOREIGN PATENT DOCUMENTS

| 1 903 495 | 7/1970 | Germany | 192/45.1 |
| 63-106432 | 5/1988 | Japan . | |

*Primary Examiner*—Rodney H. Bonck
*Attorney, Agent, or Firm*—Birch, Stewart, Kolasch & Birch, LLP

[57] ABSTRACT

A one-way clutch includes an annular retainer including sprag pockets formed in a plurality of portions of its side face in the circumferential direction, and spring mounting portions formed circumferentially adjacent to the sprag pockets; sprags to be fitted in the sprag pockets; and spring members mounted in the spring mounting portions for holding the sprags in predetermined positions in the sprag pockets. The one-way clutch is assembled by mounting the sprags and the spring members sideways of the retainer.

7 Claims, 11 Drawing Sheets

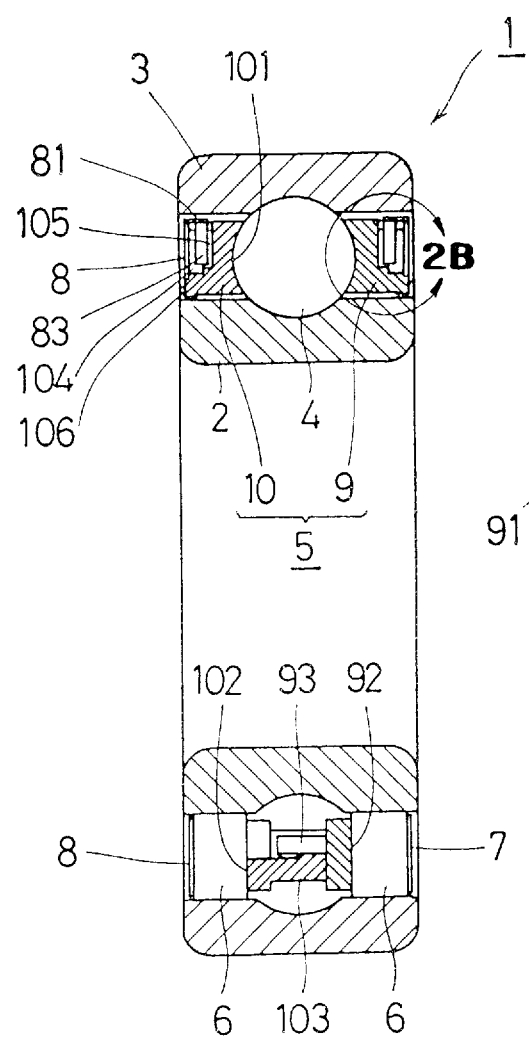
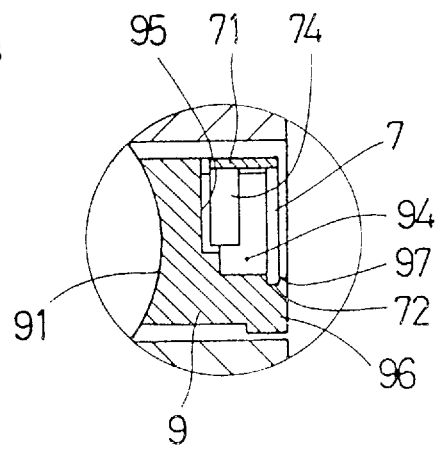
FIG. 2A
FIG. 2B

F I G. 5
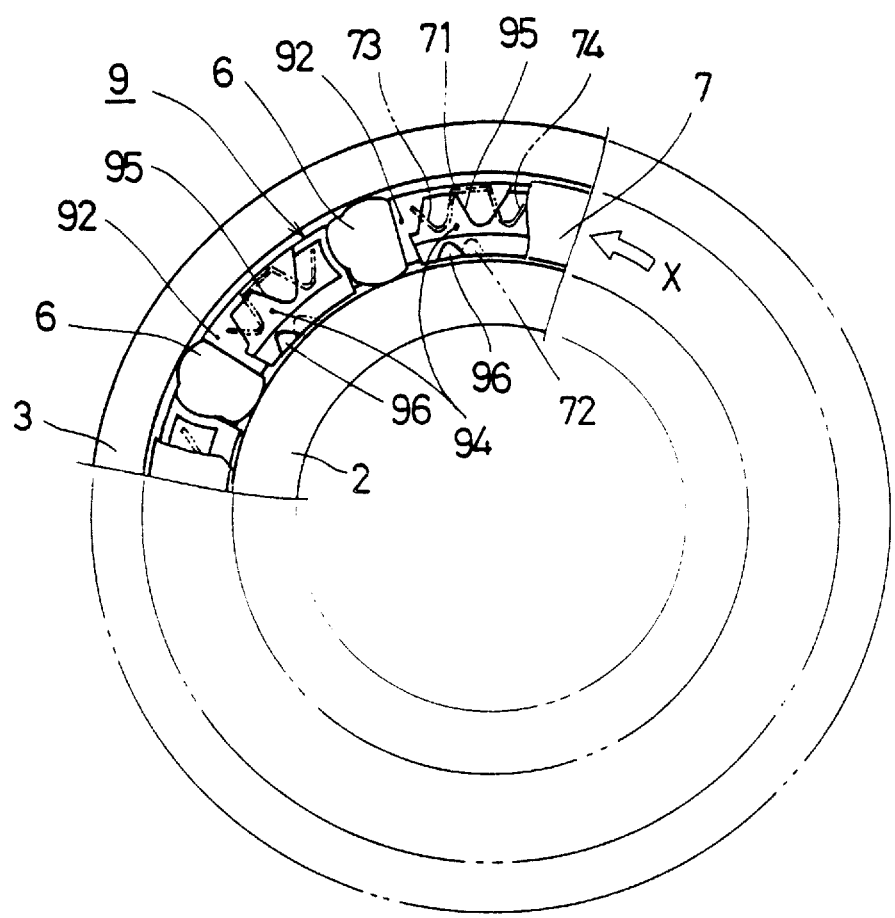

F I G. 9
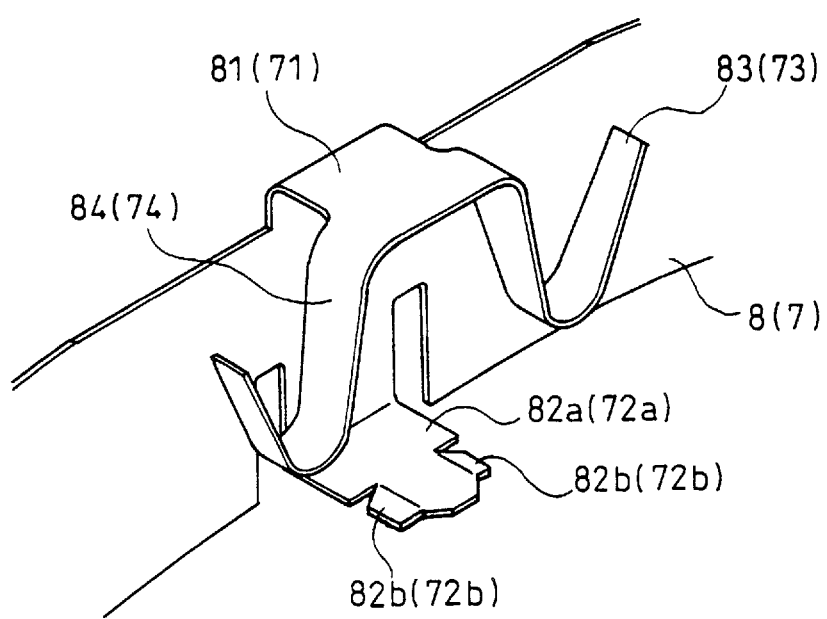

ONE-WAY CLUTCH, ROLLER BEARING WITH ONE-WAY CLUTCH, AND METHOD OF ASSEMBLING ROLLER BEARING WITH ONE-WAY CLUTCH

BACKGROUND OF THE INVENTION

1. Field of the Invention

The present invention relates to a sprag type one-way clutch, a roller bearing with the sprag type one-way clutch and a method of assembling the roller bearing with the sprag type one-way clutch and, more particularly, to a construction for mounting sprags and spring members holding the sprags.

2. Description of Related Art

One example of the sprag type one-way clutch of the prior art is disclosed in Japanese Patent Laid-Open No. 106432/1988, for example.

The one-way clutch of this Laid-Open Patent is shown in FIGS. 11 and 12, where FIG. 11 is an elevational view showing a portion of the one-way clutch; and FIG. 12 is an expanded top plan view showing the periphery of a retainer.

The one-way clutch of the Laid-Open Patent is assembled integrally with a deep groove type ball bearing 50, which is composed of inner and outer rings 51 and 52, balls 53 and a retainer 54, and is composed of sprags 55 and coil springs 56 to be mounted in the retainer 54 of the deep groove type ball bearing 50.

The retainer 5 is composed of two annuli 57 and 58 which are coupled to clamp the balls 53 from the two axial sides. These two annuli 57 and 58 are provided at a plurality of circumferential portions with sprag pockets 59 and 60 which extend radially inward and outward. In each of these sprag pockets 59 and 60, there are fitted three sprags 55 which are arranged circumferentially adjacent to each other. Moreover, the annuli 57 and 58 are opened radially outward at the one circumferential ends of the sprag pockets 59 and 60 and provided with recessed coil spring pockets 61 and 62 which are opened toward the sprag pockets 59 and 60. In these coil spring pockets 61 and 62, there are compressed and fitted the coil springs 56 for urging the sprags 55 individually to upright positions.

For assembling this deep groove type ball bearing 50, the sprags 55 and the coil springs 56 are inserted at first into the individual annuli 57 and 58 constructing the retainer 54 so that the individual sprags 55 are retained in the sprag pockets 59 and 60 and prevented from coming out by the urging forces of the coil springs 56. These two annuli 57 and 58 are jointed to each other by bringing them into abutment against each other to hold the balls 53, which are shared and arranged between the inner and outer rings 51 and 52, between the two axial sides.

Here will be described the reason why the sprags 55 and the coil springs 56 are held at first with respect the two annuli 57 and 58. Structurally speaking, the coil springs 56 have to be inserted radially inward into the coil spring pockets 61 and 62 of the two annuli 57 and 58, but these insertions cannot be performed after the two annuli 57 and 58 are mounted between the inner and outer rings 51 and 52.

From this reasoning, at the first step of the assembling, the sprags 55 and the coil springs 56 are held with respect to the two annuli 57 and 58. In this case, however, the sprags 55 are raised to the upright position by the urging forces of the coil springs 56 so that the radially outer and inner portions of the sprags 55 are protruded from the radially outer and inner openings of the sprag pockets 59 and 60 of the annuli 57 and 58. As a result, when the individual annuli 57 and 58 are to be mounted between the inner and outer rings 51 and 52 and joined to each other at the second step of the assembling, they cannot be easily inserted between the inner and outer rings 51 and 52. Thus, the prior art requires work to insert the individual annuli 57 and 58 between the inner and outer rings 51 and 52 while inclining the sprags 55 retained in the annuli 57 and 58 by turning either of the inner and outer rings 51 and 52.

In the one-way clutch of the Laid-Open Patent, as described above, the work required to insert the two annuli 57 and 58 between the inner and outer rings 51 and 52 and to join them are extremely troublesome and difficult to make the automation thereof possible. Thus, a poor productivity is a result for the one-way clutch. Accordingly and naturally, it is also pointed out that the production cost is increased due to the poor productivity.

SUMMARY OF THE INVENTION

It is, therefore, an object of the invention to simplify the assembling works without any waste thereby to improve the productivity.

Other objects of the invention will become apparent more fully from the description given below, but it should be understood that the description and examples given below are intended to illustrate the invention, and not to limit the scope of the invention, since many modifications and variations of the examples disclosed herein are within the scope of the invention.

According to a first aspect of the invention, there is provided a one-way clutch comprising: an annular retainer including sprag pockets formed in a plurality of portions of its side face in the circumferential direction, and spring mounting portions formed circumferentially adjacent to the sprag pockets; sprags to be fitted in the sprag pockets; and spring members mounted in the spring mounting portions for holding the sprags in predetermined positions in the sprag pockets.

According to the first aspect of the invention, the retainer is provided in its side face with the sprag pockets and the spring mounting portions so that the one-way clutch can be assembled by mounting the sprags and the spring members sideways in the retainer. By using this one-way clutch, therefore, the sprags and the spring members can be mounted for assembling the bearing after the inner and outer rings are mounted on the retainer. As a result, it is possible to solve all the problems accompanying the prior art in which the inner and outer rings are mounted after the sprags and the spring members are mounted in the retainer.

According to a second aspect of the invention, moreover, there is provided a one-way clutch comprising: an annular retainer including sprag pockets formed in a plurality of portions of its side face in the circumferential direction, and spring mounting portions formed circumferentially adjacent to the sprag pockets; annular side plates to be mounted on the side faces of the retainer; sprags to be fitted in the sprag pockets; and spring members formed integrally on those side faces of the annular side plates, as confronting the retainer, and mounted, when the annular side plates are mounted on the side faces of the retainer, in the spring mounting portions for holding the sprags in predetermined positions in the sprag pockets.

In addition to the effects of the first aspect of the invention, according to the second aspect of the invention, the spring members are formed integrally on the side faces of the annular side plates, as confronting the retainer, so that they can be mounted altogether by mounting the annular side plates. As a result, the assemblage is further improved. In addition, the annular side plates are provided integrally with the spring members and positioned on the side faces of the retainer to cover the side faces of the sprag sockets to provide a stable structure which prevents the spring members from coming out of the their mounting portions and the sprags from coming out of their pockets.

In the second aspect of the invention, the positionings between the retainer and the annular side plates are exemplified by using the engaging portions which are provided in their corresponding positions and adapted to engage with each other.

Thus, the annular side plates are easily positioned by the engaging portions.

Moreover, the annular side plates are fixed on the retainer by making the engaging portions of the annular side plates into the notches, by making the engaging portions of the retainer into the protrusions to engage with the notches, and by thermally deforming the protrusions engaging with the engaging portions.

Still moreover, the annular side plates are fixed on the retainer by making the engaging portions of the annular side plates into the fitting protrusions, by making the engaging portions of the retainer into fitting recesses for fitting the fitting protrusions therein, and by fitting the fitting protrusions in said fitting recesses.

By thus fixing the annular side plates, the annular side plates are stably mounted and are fixed easily by using the fixing structure by the fitting engagement.

In the second aspect of the invention, the size of the spring mounting portions, as taken in the circumferential direction of the retainer, is made larger than that of the spring members so that the sprags are held in the predetermined positions, in which the annular side plates are circumferentially displaced, by the spring members. The aforementioned individual sizes are indicated by $L_1$ and $L_2$ in first and second embodiments of the invention.

Thanks to the construction thus far described, the spring members can be mounted with a sufficient allowance in the spring mounting portions so that they can be mounted with ease to improve the assemblage.

Moreover, the roller bearing with the one-way clutch can be achieved by combining the rolling members and the inner and outer rings with the one-way clutches having the above-specified constructions.

In addition, according to a third aspect of the invention, there is provided a method of assembling the roller bearing structure with the one-way clutch. The construction and effects of this method will not be described because they are common to those of the aforementioned first and second aspects of the invention. Incidentally, the roller bearing structure with the one-way clutch according to the third aspect of the invention should not be limited to the bearing, as specified in the embodiment, but could be applied to a construction in which the one-way clutch is mounted directly between the housing (or outer circumferential member) and the rotor (or inner circumferential member).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are incorporated in and form a part of this specification, illustrate embodiments of the invention and, together with the description serve to explain the principles of the invention.

The present invention will become more fully understood from the detailed description given hereinbelow and the accompanying drawings which are given by way of illustration only, and thus are not limitative of the present invention, and wherein:

FIG. 2 is a cross section taken along line (2)—(2) of FIG. 1;

FIG. 5 is a partially enlarged view for explaining the operation to mount the annular side plates on the retainer of Embodiment 1;

FIG. 9 is a perspective view showing a portion of an annular side plate of Embodiment 2 of the invention in an enlarged scale.

FIG. 11 is an elevational view showing a portion of a one-way clutch of the prior art, and FIG. 12 is an expanded top plan view showing the periphery of a retainer of the one-way clutch of the prior art.

In all these figures, like components are indicated by the same numerals.

DETAILED DESCRIPTION OF THE INVENTION

The present invention will be described in detail in connection with its embodiments, as shown in FIGS. 1 to 10. The invention is exemplified by a deep groove type ball bearing having a sprag type one-way clutch packaged therein.

Figure 1:
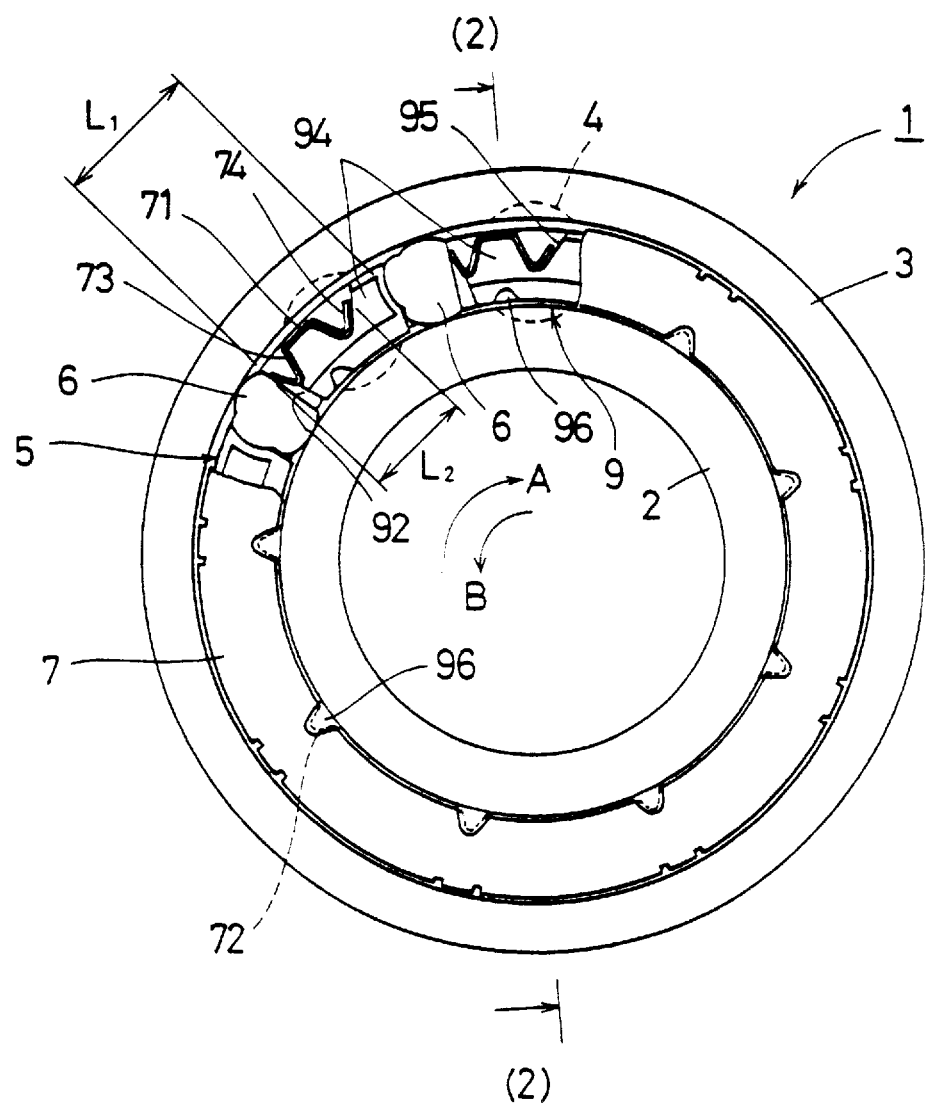
FIG. 1 is a side elevational view showing a deep groove type ball bearing with a one-way clutch according to Embodiment 1 of the invention.
Figure 3:
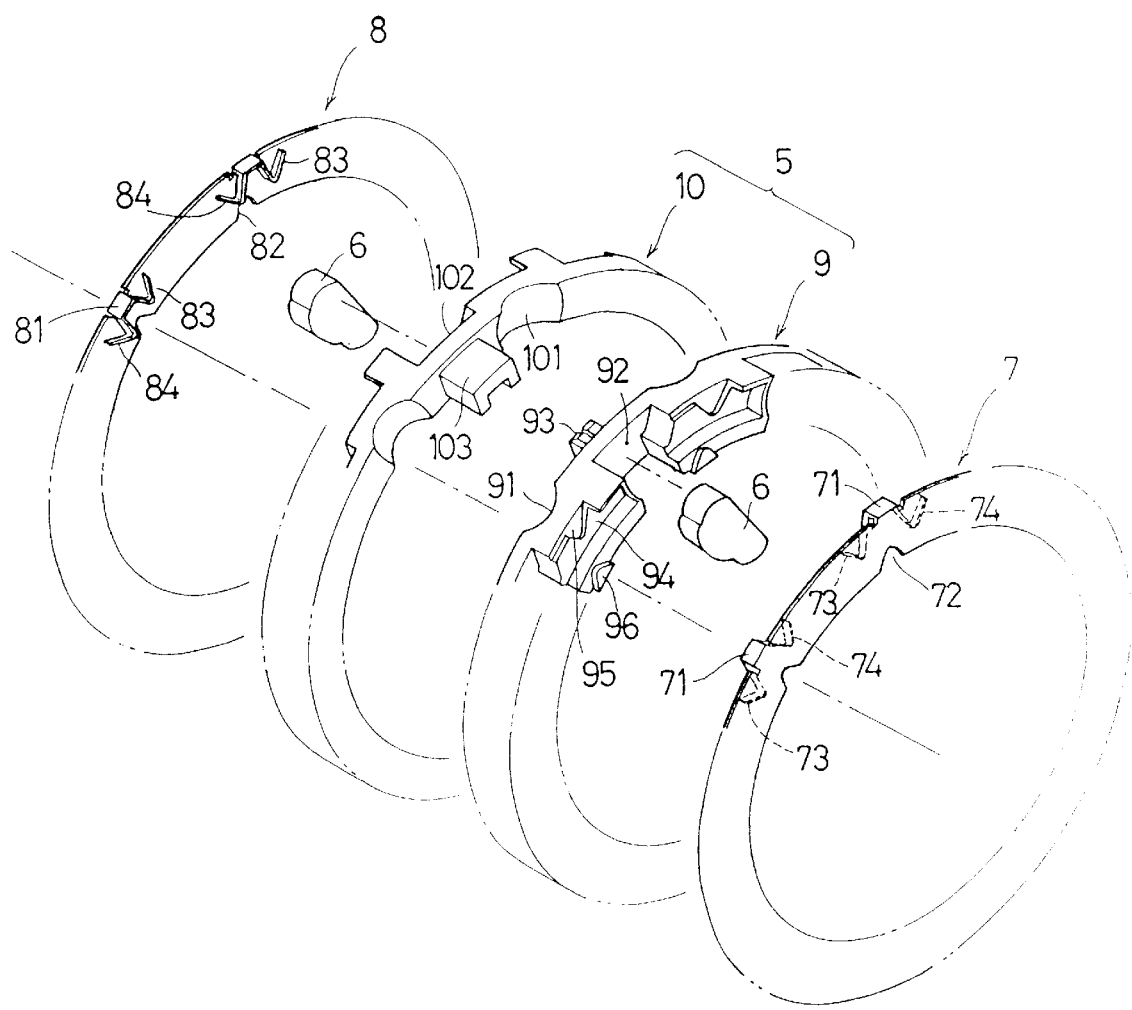
FIG. 3 is an exploded perspective view showing a retainer and annular side plates of Embodiment 1.
Figure 4:
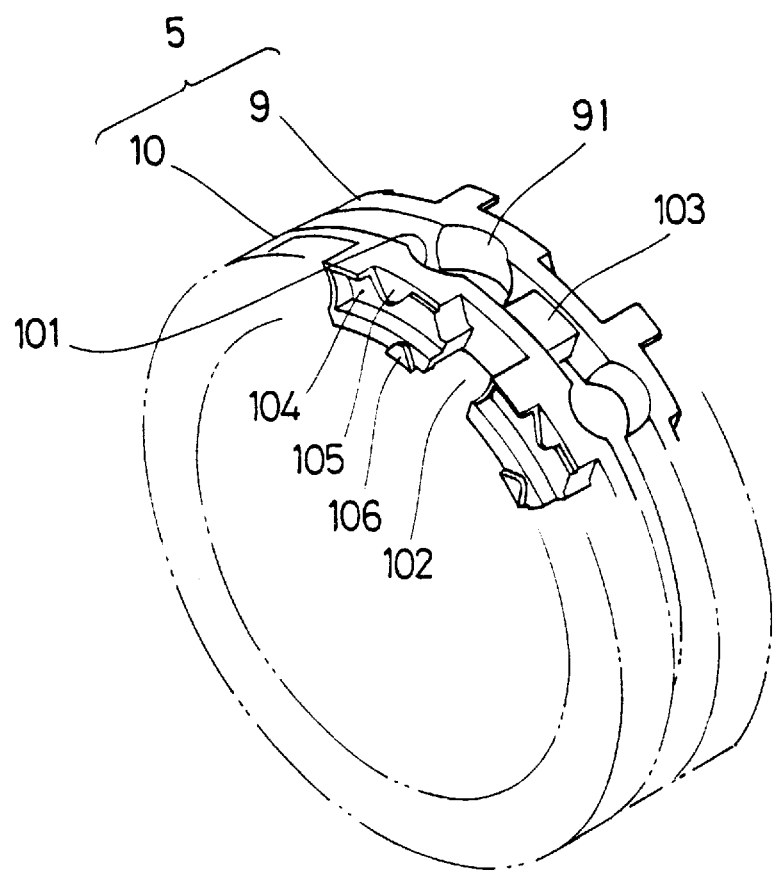
FIG. 4 is a perspective view showing the retainer of Embodiment 1.

In FIGS. 1 to 5 presenting Embodiment 1 of the invention: FIG. 1 is a side elevational showing a deep groove type ball bearing with a sprag type one-way clutch; FIG. 2 is a cross section taken along line (2)—(2) of FIG. 1; FIG. 3 is an exploded perspective view showing a retainer and annular side plates; FIG. 4 is a perspective view of the retainer; and FIG. 5 is a partially enlarged view for explaining the operation to mount the annular side plates on the retainer.

Reference numeral 1 appearing in the drawings indicates the entirety of the deep groove type ball bearing. This deep groove type ball bearing 1 is composed of an inner ring 2, an outer ring 3, a plurality of balls 4 acting as rolling members, and a retainer 5. In the two axial side portions of the retainer 5, there are mounted a plurality of sprags 6 and two annular side plates 7 and 8, each of which constructs the one-way clutch.

The first and second annular side plates 7 and 8 are formed to have identical shapes and provided at several circumferential portions of their one side with bent members 71 and 81 acting as spring members and at their inner circumferences in the same phase positions as those of the bent members 71 and 81 with V-shaped notches 72 and 82 acting as engaging portions for being fixed on the retainer 5. The bent portions 71 and 81 are provided at two ends of their circumferential band portions with first and second spring portions 73, 74, 84 and 83 which have generally V-letter shapes and extend in the circumferential directions. Incidentally, the first spring portions 73 and 84 are used to apply pressures upon the sprags 6, and the second spring portions 74 and 83 are used to position the first and second annular side plates 7 and 8 when assembled with respect to annuli 9 and 10, as will be described in more detail. In order to use the first and second annular side plates 7 and 8 commonly as belonging to a kind, the bent members 71 and 81 are provided with the two spring portions 73, 74, 84 and 83. In case, however, the first and second annular side plates 7 and 8 are not commonly used, the bent members 71 or 81 of each annular side plate 7 or 8 may be provided with one spring portion such as the first one 73 or 84.

The retainer 5 is constructed with the paired annuli 9 and 10 which are axially adjacent to each other so that they can be released from each other. These annuli 9 and 10 are made of a synthetic resin.

The first annulus 9 is provided in a plurality of circumferential portions at its one axial side with ball pocket recesses 91 for retaining the balls 4, and between the ball pocket recesses 91 at its other axis side with sprag pockets 92 for fitting the sprags 6 therein. The first annulus 9 is further provided in the same phase positions as those of the sprag pockets 92 at its one axial side with split retaining members 93 axially protruding, and in the same phase positions as those of the ball pocket recesses 91 at its other axial side with spring mounting portions 94. These spring mounting portions 94 are formed to have a larger circumferential size $L_1$ than that $L_2$ of the bent members 71.

The second annulus 10 is provided in a plurality of circumferential portions at its one axial side with ball pocket recesses 101 for retaining the balls 4, and between the ball pocket recesses 101 at its other axis side with sprag pockets 102 for fitting the sprags 6 therein. The second annulus 10 is further provided in the same phase positions as those of the sprag pockets 102 at its one axial side with U-shaped engaging members 103 axially protruding for engaging with the split retaining members 93 of the first annulus 9, and in the same phase positions as those of the ball pocket recesses 101 at its other axial side with spring mounting portions 104. These spring mounting portions 104 are formed to have a larger circumferential size $L_1$ than that $L_2$ of the bent members 81.

The individual sprag pockets 92 and 102 of those two annuli 9 and 10 are the recessed notches which are opened radially inward and outward and axially to the other side. The working recesses 94 and 104 of the two annuli 9 and 10 are provided in their individual deep walls with V-shaped grooves 95 and 105 for fitting therein the second spring portions 74 and 83 of the bent members 71 and 81 of the first and second annular side plates 7 and 8, and in their individual vicinities with triangular protrusions 96 and 106 acting as the protruding engaging portions for fixing the first and second annular side plates 7 and 8 in positions.

Incidentally, the first and second annuli 9 and 10 are different only in the split retaining member 93 and the U-shaped engaging member 103, but their remaining portions are basically made in the same positions and shapes. When the split retaining member 93 and U-shaped engaging member 103 are engaged, their radially inner sides define a clearance. This clearance is utilized for reserving a lubricant such as grease.

The sprag 6 is a rectangular prism having curved cam faces on its upper and lower faces and a partially arcuate convex cam portion on its front face and is inclinably fitted in each of the sprag pockets 92 and 102 of the retainer 5.

When the first and second annular side plates 7 and 8 are mounted on the individual annuli 9 and 10 constructing the retainer 5, the first spring portions 73 and 84 of the first and second annular side plates 7 and 8 are so fitted in the clearances between the wall faces of the sprag pockets 92 and 102 at one circumferential end and one side faces of the sprags 6 fitted in the sprag pockets 92 and 102 that they are compressed to urge the individual sprags 6 to upright positions.

Here will be described the operations of the one-way clutch in the deep groove type ball bearing 1. The operations are exemplified by the case in which the inner ring 2 is located at the drive side whereas the outer ring 3 is located at the driven side.

As the inner ring 2 is rotated in a reverse manner, as indicated by arrow A in FIG. 1, in which the bent members 71 and 81 are pushed by the first spring portions 73 and 84, the sprags 6 are raised to the upright positions so that the pushing forces of the first spring portions 73 and 84 are applied to bring the deep groove type ball bearing 1 into a locked state. As a result, the inner ring 2 and the outer ring 3 are united to rotate synchronously.

On the other hand, as the inner ring 2 is rotated in the direction as indicated by arrow B in FIG. 1, in which the bent members 71 and 81 are pushed by the first spring portions 73 and 84, the sprags 6 are brought into inclined positions against the pushing forces of the first spring portions 73 and 84 so that the deep groove type ball bearing 1 is set free. As a result, no rotational force is transmitted from the inner ring 2 to the outer ring 3 so that the inner ring 2 rotates idly whereas the outer ring 3 stands still.

Here will be described the procedures and operations for assembling the deep groove type ball bearing 1.

(1) The balls 4 are fitted in a desired number between the inner and outer rings 2 and 3.

(2) These balls 4 are distributed generally equally in the circumferential direction. The first and second annuli 9 and 10, as separated, are so individually applied in two axial directions as to interpose the balls 4 so that the split retaining member 93 of the first annulus 9 is brought into engagement with the U-shaped engaging member 103 of the second annulus 10. As a result, the first and second annuli 9 and 10 are united to construct the retainer 5.

(3) The sprags 6 are axially inserted one by one into the sprag pockets 92 of the first annulus 9, and the first annular side plate 7 is positioned and fixed on the first annulus 9.

(4) The sprags 6 are axially inserted one by one into the sprag pockets 102 of the second annulus 10, and the second annular side plate 8 is positioned and fixed on the second annulus 10. Thus, the assembling operations are finished.

Here will be described in more detail the method of mounting the first and second annular side plates 7 and 8 on the first and second annuli 9 and 10. In this detailed description, however, an example of the first annulus 9 will be taken up because the method of mounting the first annular side plate 7 on the first annulus 9 is similar to that of mounting the second annular side plate 8 on the second annulus 10.

First of all, the first annular side plate 7 is applied from one axial side of the first annulus 9, and as shown in FIG. 5, the individual bent members 71 of the first annular side plate 7 are inserted as a whole into the spring mounting portions 94 exposed to the outer side of the first annulus 9, where the corresponding sprag pockets 92 of the spring mounting portions 94 are not located. Since these spring mounting portions 94 are given the circumferential size $L_1$ made larger than that $L_2$ of the bent members 71, as described above, the first annular side plate 7 is neither positioned nor fixed yet in this state. By turning only the first annular side plate 7 from this state in the direction, as indicated by arrow X in FIG. 5, the first spring portions 73 of the bent members 71 are brought into abutment against the backs of the sprags 6 and are compressed if further turned. When the V-shaped notches 72 of the first annular side plate 7 reaches the positions where the triangular protrusions 96 of the first annulus 9, the turning motion is interrupted, and the V-shaped notches 72 are fitted on the triangular protrusions 96 by pushing the first annular side plate 7 toward the first annulus 9. As a result, the second spring portions 74 of the bent members 71 come into the V-shaped grooves 95 formed in the deep wall of the working recesses 94 of the first annulus 9. After this, the triangular protrusions 96 of the first annulus 9, as made of a synthetic resin, are thermally deformed. As a result, as shown in the partially enlarged view in FIG. 2, the thermally deformed portions 97 of the triangular protrusions 96 are raised to the outer side of the V-shaped notches 72 of the annular side plate 7 so that the annular side plate 7 is fixed on the first annulus 9. When the triangular protrusions 96 are to be crushed, care is taken to keep the internal diameter of all the thermally deformed portions 97 away from contact with the outer circumference of the inner ring 2, as shown in FIG. 2, thereby to avoid any increase in the rotational torque of the deep groove type ball bearing 1.

The first spring portions 73 and 84 or the components of the one-way clutch are united with the annular side plates 7 and 8, as has been described, so that the working efficiency is improved better than that of the example of the prior art using a plurality of coil springs. By the operation to push the annular side plates 7 and 8 in the predetermined positions toward the retainer 5 while applying them from the side of the retainer 5 and turning the same circumferentially, the first spring portions 73 and 84 of the annular side plates 7 and 8 can be placed in the required positions. Consequently, the assembling works are far more simplified than those of the prior art so that they can be easily performed. As a result, the automation is facilitated to make a contribution to an improvement in the productivity. Since, moreover, the clearance for reserving the lubricant is established at the radially inner side of the portion jointing the two annuli 9 and 10 constructing the retainer 5, the lubrication of the deep groove type ball bearing 1 and the lubrication of the one-way clutch in the free operation can be made excellent over a long time period.

Figure 6:
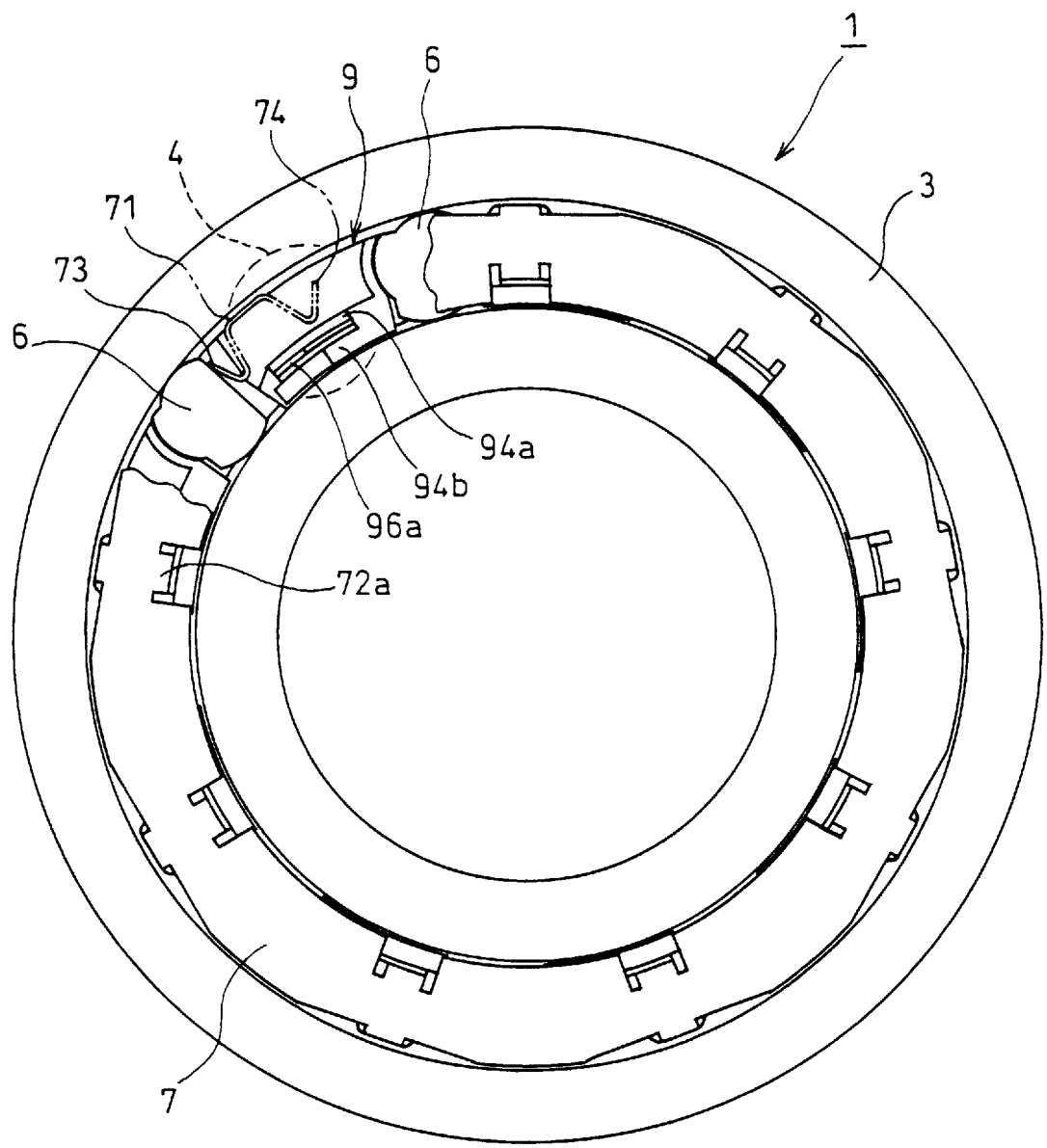
FIG. 6 is similar to FIG. 1 but shows Embodiment 2 of the invention.
Figure 7A:
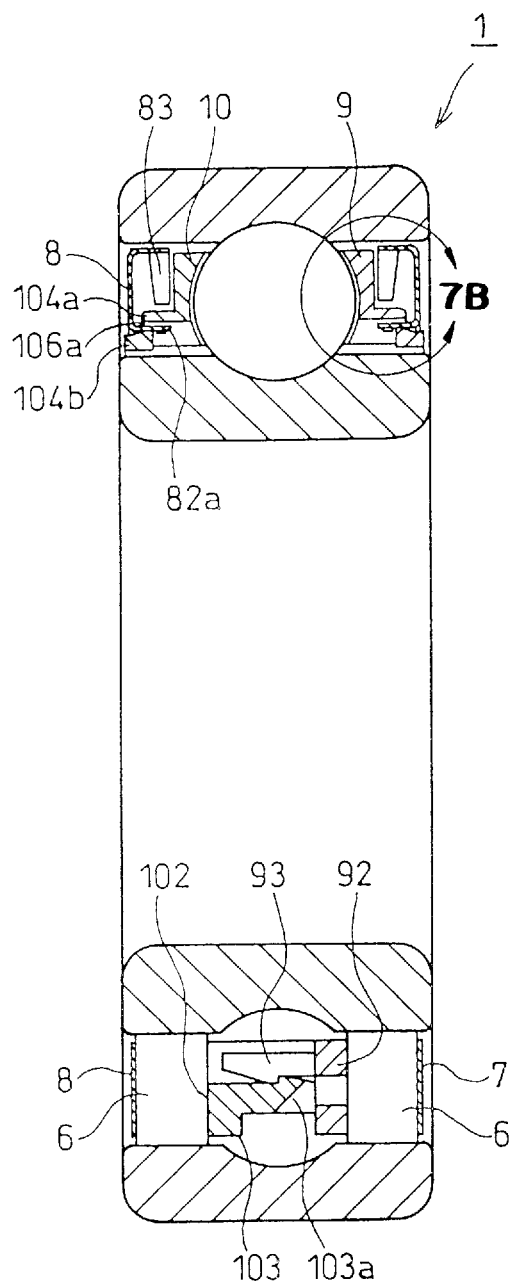
FIG. 7 is similar to FIG. 2 but shows Embodiment 2 of the invention.
Figure 7B:
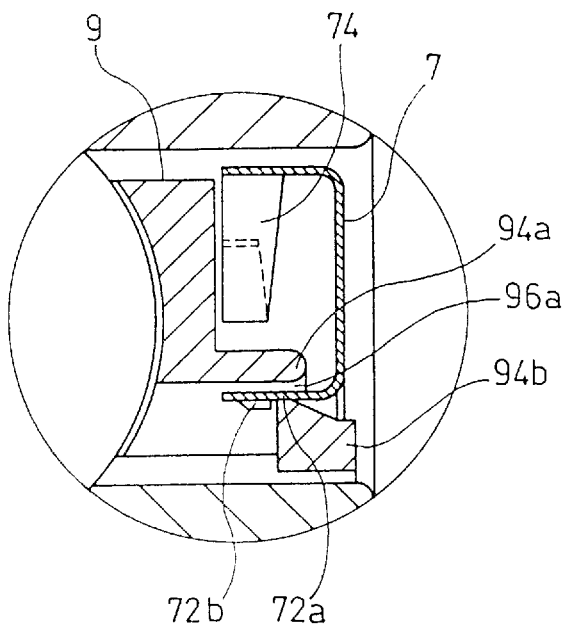
Figure 8:
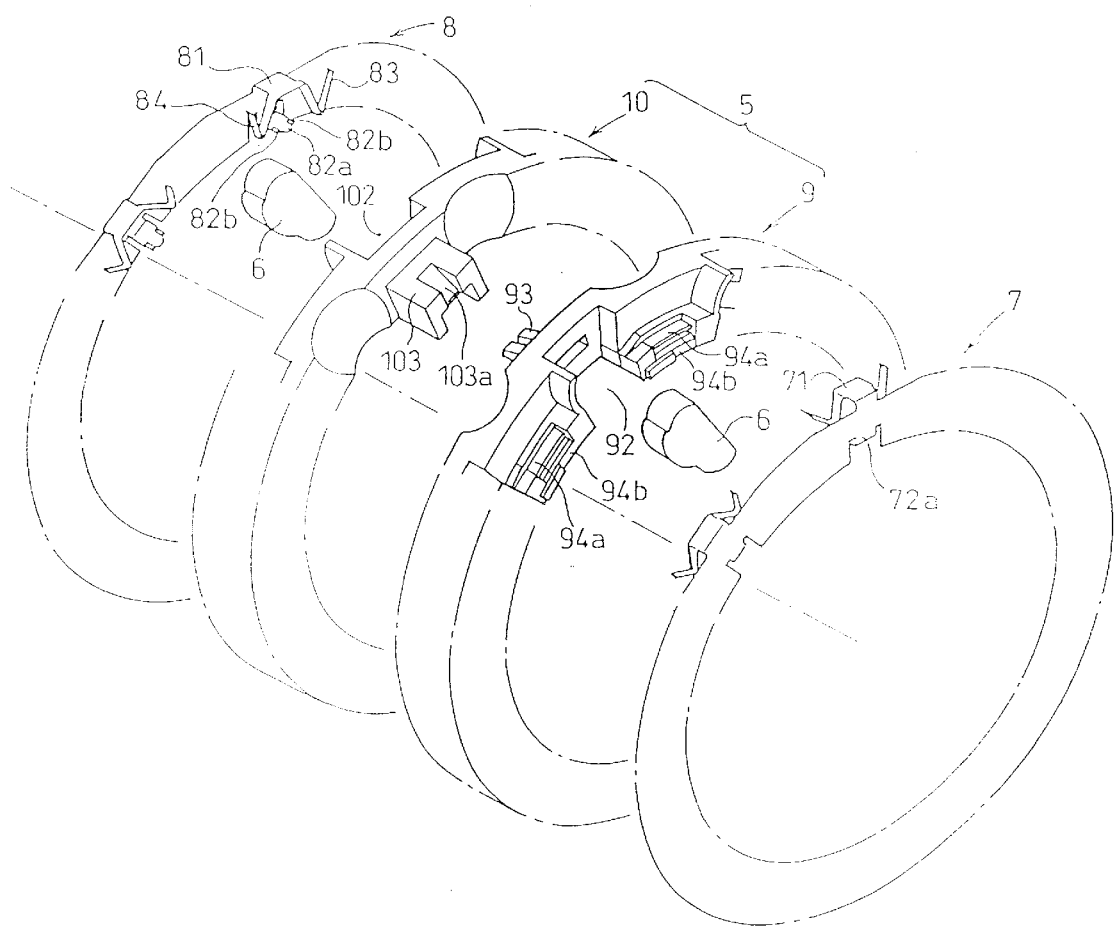
FIG. 8 is similar to FIG. 3 but shows Embodiment 2 of the invention.
Figure 10:
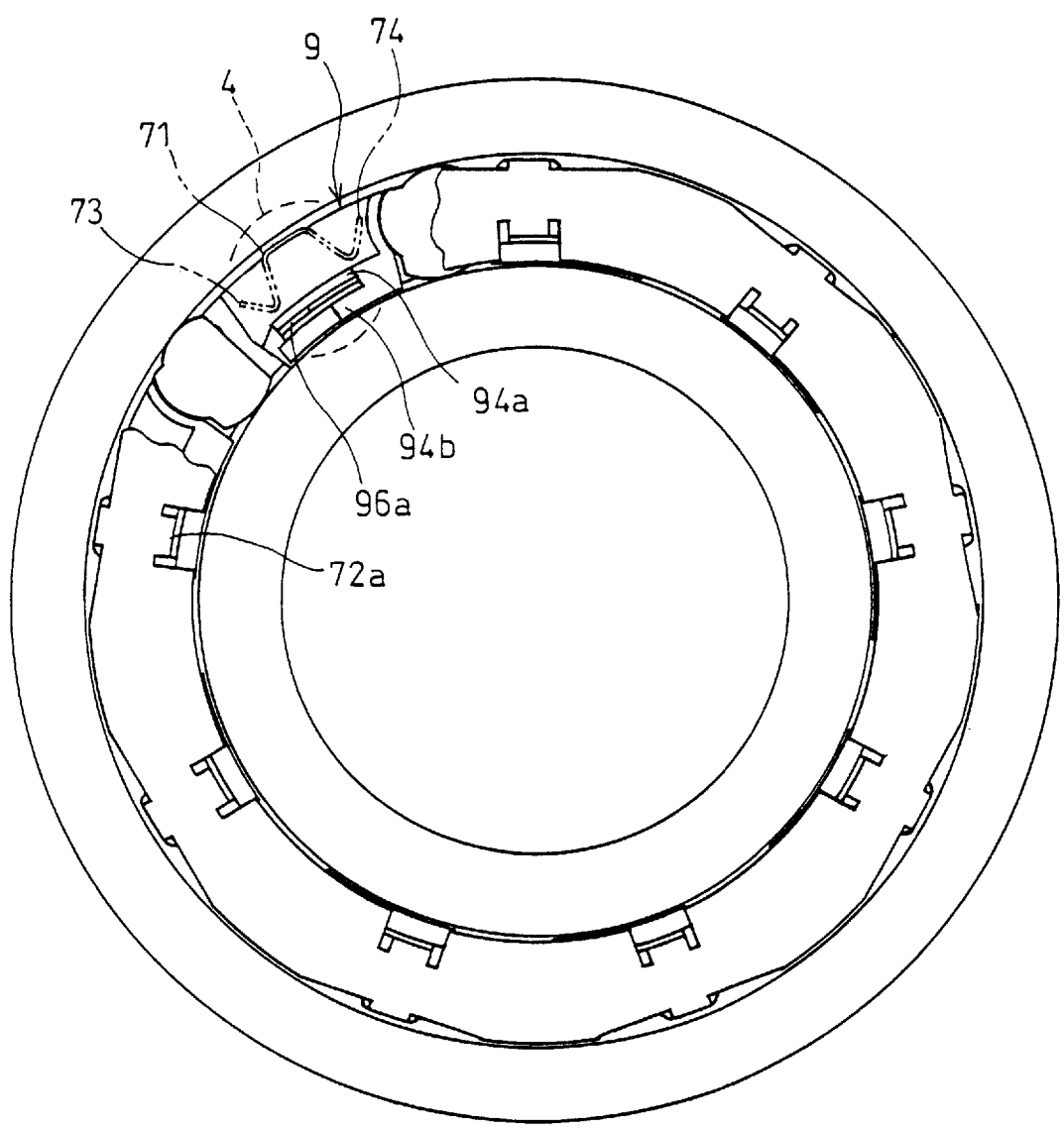
FIG. 10 is similar to FIG. 5 but shows Embodiment 2 of the invention.
Figure 11:
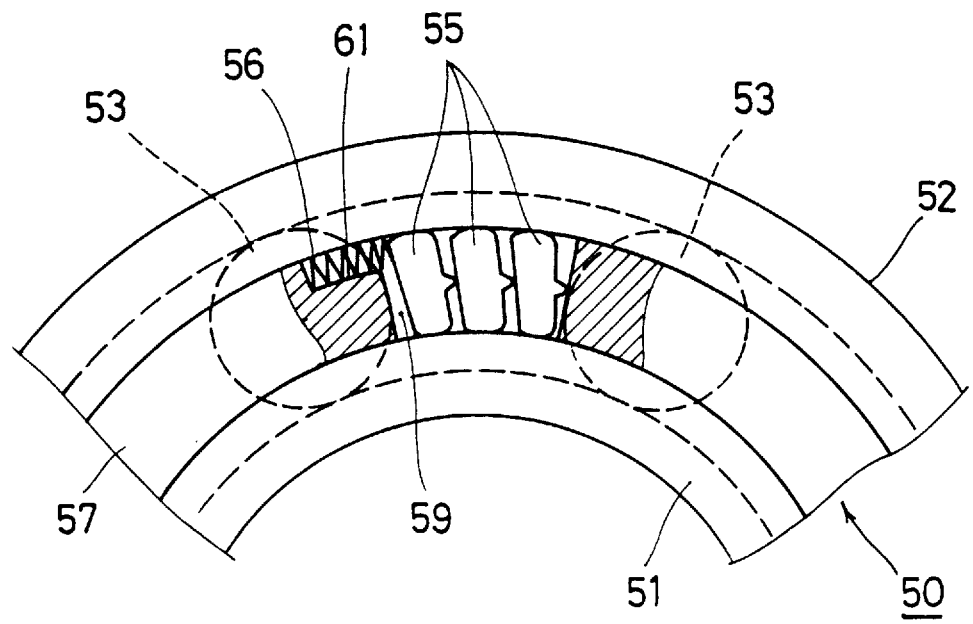
In FIGS. 11 and 12 showing an example of the prior art.
Figure 12:
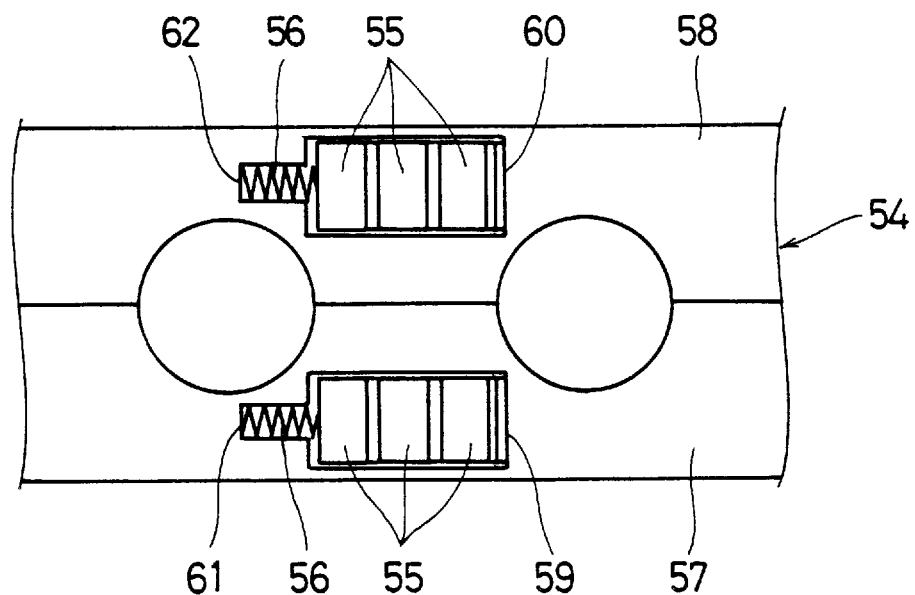

In FIGS. 6 to 10 showing Embodiment 2 of the invention: FIG. 6 is similar to FIG. 1; FIG. 7 is similar to FIG. 2; FIG. 8 is similar to FIG. 3; FIG. 9 is an enlarged perspective view showing a portion of an annular side plate; and FIG. 10 is similar to FIG. 5.

The difference of Embodiment 2 from Embodiment 1 resides in that the first and second annular side plates 7 and 8 can be mounted on the retainer 5 simply by a single action.

In short, the two annular side plates 7 and 8 are provided with tongues 72a and 82a acting as the engaging portions of the fitting protrusions, in place of the V-shaped notches 72 and 82 of Embodiment 1. These tongues 72a and 82a are bent at a right angle from the inner circumferences of the body portions of the two annular side plates 7 and 8 and are cut at the two circumferential sides of their leading ends and bent to form stop members 72b and 82b.

The first and second annuli 9 and 10, as constructing the retainer 5, are provided along their circumferences in the lower portions of the spring mounting portions 94 and 104 with pairs of guide flanges 94a and 94b, and 104a and 104b spaced radially from each other and with engaging holes 96a and 106a extending axially therethrough and acting as the engaging portions in the form of fitting recesses, in place of the triangular protrusions 96 and 106 of Embodiment 1. In Embodiment 2, similar to the first embodiment, the circumferential size $L_1$ of the spring mounting portions 94 and 104 is made larger than that $L_2$ of the bent members 71 and 81. The engaging holes 96a and 106a are arranged between the paired guide flanges 94a and 94b and between the paired guide flanges 104a and 104b.

Here will be described the procedures of mounting the annular side plates 7 and 8 of Embodiment 2. Here is also taken up only the procedure of mounting the first annular side plate 7 as in Embodiment 1.

Although the operation of turning the first annular side plate 7 a desired angle in one circumferential direction while being applied to the side of the first annulus 9, the working content for the operation is different.

Specifically, the leading ends of the tongues 72a of the first annular side plate 7 are sandwiched in the regions between the paired guide flanges 94a and 94b of the first annulus 9 but without the engaging hole 96a. In this state, the stop members 72b of the tongues 72a are slightly elastically deformed to enter the gaps between the guide flanges 94a and 94b so that the first annular side plate 7 is held, while being tentatively stopped with respect to the first annulus 9, by those stop members 72b. At this time, the spring portions 73 and 74 of the first annular side plate 7 are kept in a natural state away from contact from the sprags 6, as indicated by phantom lines in FIG. 10.

From this state, the first annular side plate 7 is turned a desired angle counter-clockwise of FIG. 10. As a result, the tongues 72a of the first annular side plate 7 reach the regions between the paired guide flanges 94a and 94b, where the engaging holes 96a are formed. Then, the first annular side plate 7 is pushed toward the first annulus 9 to insert the tongues 72a into the engaging holes 96a. As a result of these insertions, the stop members 72b of the tongues 72a are restored to clamp the engaging holes 96a so that the tongues 72a cannot easily come out, thus finishing the mounting works. At this time, the first spring portions 73 of the first annular side plate 7 are compressed to push the sprags 6, as indicated by phantom lines in FIG. 10.

Thus, in Embodiment 2, the annular side plates 7 and 8 can be mounted by the simple operations of moving them to eliminate the thermally deforming treatment of the foregoing embodiment so that the assembly can be efficiently effected to make a contribution to an improvement in the productivity.

In addition, according to Embodiment 2, the U-shaped engaging members 103 of the second annulus 10 are provided with the notches 103a so that they can be easily warped when engaged with the split retaining members 93 of the first annulus 9.

Incidentally, the present invention should not be restricted to only Embodiments 1 and 2, but the following various applications and modifications can be conceived.

(1) Embodiments 1 and 2 are exemplified by incorporating the one-way clutch into the roller bearing, but the one-way clutch could be constructed of the retainer, the sprags and the spring elements. In this modification, the one-way clutch may have one or two rows.

(2) In Embodiments 1 and 2, the bent members 71 and 81 are formed at the outer circumferences of the first and second annular side plates 7 and 8 but could be formed at the inner circumferences.

(3) In Embodiment 2, the shapes of the tongues 72a and 82a of the first and second annular side plates 7 and 8 and the shapes of the guide flanges 94a, 94b, 104a and 104b and the engaging holes 96a and 106a of the first and second annuli 9 and 10, as constructing the retainer 5, could be modified into others although not exemplified.

While there has been described what is at present considered to be preferred embodiments of the invention, it will be understood that various modifications may be made therein, and it is intended to cover in the appended claims all such modifications as fall within the true spirit and scope of the invention.

What is claimed is:

1. A one-way clutch comprising:
   an annular retainer including sprag pockets which are formed in a plurality of portions of a side face of said retainer in the circumferential direction, and a plurality of working recesses which are formed circumferentially adjacent to said sprag pockets and which are exposed to an outer peripheral side of said retainer;
   annular side plates to be mounted on the side faces of said retainer;
   sprags to be fitted in said sprag pockets; and
   spring members formed integrally on those side faces of said annular side plates, as confronting said retainer, and mounted, when said annular side plates are mounted on the side faces of said retainer, in said working recesses for holding said sprags in predetermined positions in said sprag pockets, said working recesses guide said spring members during rotational movement of said annular side plates relative to said retainer during assembly of said clutch.

2. The one-way clutch according to claim 1, wherein said annular side plates and said retainer include engaging portions formed in corresponding positions for engaging each other and guiding said annular side plates with respect to said retainer.

3. The one-way clutch according to claim 2, wherein the engaging portions of said annular side plates are notches, the engaging portions of said retainer are protrusions for engaging with said notches, so that the protrusions engaging with said engaging portions are thermally deformed to fix said annular side plates on said retainer.

4. The one-way clutch according to claim 2, wherein the engaging, portions of said annular side plates are protrusions whereas the engaging portions of said retainer are recesses for fitting said protrusions therein, so that said protrusions are fitted in said recesses to fix said annular side plates on said retainer.

5. The one-way clutch according to claim 2, wherein the size of said spring mounting portions in the circumferential direction of said retainer is made larger than the size of said spring members so that said spring members hold said sprags in predetermined positions when said annular side plates are displaced in the circumferential direction.

6. A method of assembling a one-way clutch, the method comprising the steps of:
   providing an annular retainer;
   forming a plurality of sprag pockets in the annular retainer;
   providing a plurality of annular side plates having a plurality of spring members;
   mounting sprags into the sprag pockets of the annular retainer, respectively,
   temporarily fitting the spring members of said annular side plates into working recesses of the annular retainer by moving each annular side plate in the axial direction;
   bringing each of said spring members into contact with one side face of each of said sprags within said sprag pockets by further turning each of said annular side plates; compressing said spring members by further turning each of said annular side plates;
   inserting each of said spring members under tension into a gap between one end wall face of each of said sprag pockets and one side face of each of said sprag pockets by pressing a respective annular side plate against the annular retainer; and
   fixedly amounting respective annular side plates to the annular retainer.

7. A roller bearing comprising a combination of a one-way clutch, rollers, an inner ring and an outer ring, wherein said one-way clutch comprises:
   an annular retainer including sprag pockets formed in a plurality of portions of a side face of said annular retainer in the circumferential direction, roller pockets formed among the sprag pockets in the circumferential direction and working recesses exposed to the outer peripheral surface thereof and formed circumferentially adjacent to said sprag pockets;
   annular side plates to be mounted on the side faces of said retainer;
   sprags to be fitted in said sprag pockets, respectively; and
   spring members integrally formed in succession on side faces of said annular side plates which confront said retainer and mount thereto when said annular side plates are mounted on the side faces of said retainer, in said working recesses for holding said sprags in predetermined positions, respectively, in said sprag pockets, said working recesses guide said spring members during rotational movement of said annular side plates relative to said retainer during assembly of said clutch; said rollers are retained in roller pockets of said annular retainer, respectively; and said inner ring and said outer ring are so arranged as to rotate relative to each other through said rollers.

* * * * *